P. F. HOLMGREN.
BEARING.
APPLICATION FILED APR. 18, 1916.

1,215,374.

Patented Feb. 13, 1917.

WITNESS
Alex Currie

INVENTOR.
Per F. Holmgren
BY
Lewis J. Doolittle
ATTORNEY

UNITED STATES PATENT OFFICE.

PER F. HOLMGREN, OF BROOKLYN, NEW YORK.

BEARING.

1,215,374.  Specification of Letters Patent.  Patented Feb. 13, 1917.

Application filed April 18, 1916. Serial No. 91,882.

*To all whom it may concern:*

Be it known that I, PER F. HOLMGREN, a citizen of the United States, and resident of Brooklyn, city of New York, county of Kings, and State of New York, have invented certain new and useful Improvements in Bearings, of which the following is a specification.

This invention relates to a bearing and it has for its object to provide a bearing construction which will render the entrance of dust (such as is thrown off by grinding wheels in operation) or other particles of grit or small matter between the bearing surfaces more difficult.

The invention also has for an object the provision of improved means for lubricating the bearing surfaces.

For further comprehension of the invention, and of the objects and advantages thereof, reference will be had to the following description and accompanying drawings, and to the appended claims in which the novel features of the invention are more particularly set forth.

Figure 1 of the drawings is a horizontal sectional view of a bearing, with a shaft mounted therein, constructed according to the invention.

Figure 1:
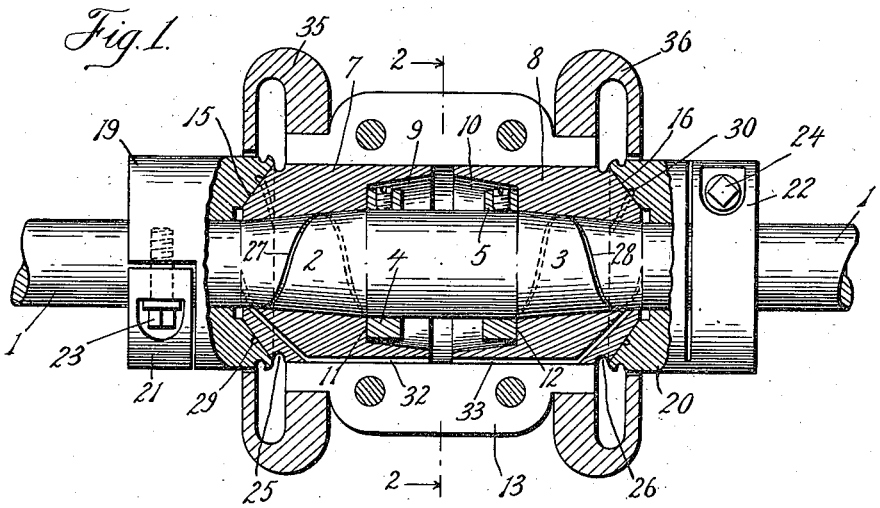
Figure 2:
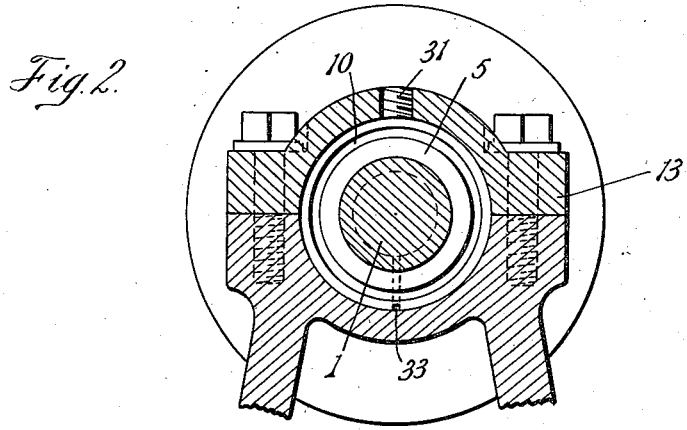
Fig. 2 is a transverse section on the line 2—2 Fig. 1.
Figure 3:
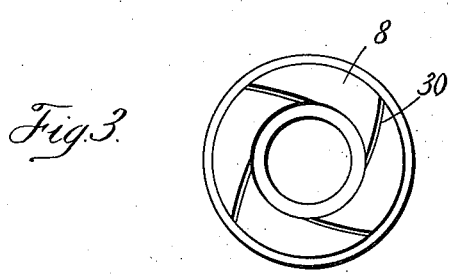
Fig. 3 is a face view of one of the locking collars.

In the drawings 1 represents a shaft which is formed with two tapering portions, 2 and 3 respectively, enlarging toward one another. These tapered portions each terminate at their adjacent ends in circumferential flanges 4 and 5 respectively, which may be formed by adjustable collars.

The supporting bearing for the shaft comprises a pair of sleeves 7 and 8 of bronze or other suitable material, bored to fit the tapered portions 2 and 3 of the shaft, the bores through the sleeves being enlarged at adjacent ends as at 9 and 10 to accommodate the flanges 4 and 5, these enlargements 9 and 10 presenting shoulders 11 and 12 adapted to bear against the flanges. These sleeves 7 and 8 are non-rotatably supported in any suitable manner in the bearing box 13.

The ends of the bearing sleeves 7 and 8 opposite to those having the enlarged recesses 9 and 10 are tapered to cone shape as shown at 15 and 16, these cone-shaped ends engaging in complementary recesses formed in a pair of lock collars 19 and 20 adjustably fixed upon the shaft. These lock collars may be secured to the shaft by any suitable means. In the present instance integral semi-circular tongue portions 21 and 22 are slotted from the collars and bolts 23 and 24, passing freely through the ends of the tongues and threaded into the collars, serve to clamp the latter upon the shaft. The peripheries of the sleeves 7 and 8 are preferably formed with annular grooves 25 and 26 which help to prevent dust or the like entering between the engaging cone faces.

Each of the tapered shaft portions 2 and 3 is formed on its periphery with a spiral oil groove, these grooves being shown at 27 and 28 respectively, while the conical recesses of the locking collars 19 and 20 are each formed with preferably a series of spirally disposed oil grooves indicated respectively at 29 and 30. Oil for lubrication may be supplied in any suitable manner through the opening 31 in the cap of the bearing box 13, this opening communicating with the space between adjacent ends of the bearing sleeves 7 and 8.

From this space grooves or passages 32 and 33 respectively lead through the sleeves 7 and 8 to the shaft to a point adjacent the conical ends of the sleeves, which is the point of meeting of the locking collars 19 and 20 and bearing sleeves. The direction of rotation of the shaft with respect to the disposition of the spiral oil grooves will be such that the oil leaving the passages 32 and 33 will be caused by centrifugal force to enter the spiral grooves and travel inwardly over the tapered shaft portions 2 and 3 toward the enlarged recesses 9 and 10, and outwardly over the cone-shaped ends of the sleeves. To catch the oil thrown off from these cone faces annular guards, 35 and 36 respectively, may be provided.

It will be apparent from the foregoing description that any opportunity for grit, metallic dust, or the like entering between the main bearing faces presented by the tapered shaft portions and bearing sleeves will be reduced to a minimum.

What I claim is:

1. A shaft bearing comprising, in combination with a rotary shaft, a fixed bearing sleeve having conical ends, and locking collars upon the shaft, such locking collars each having at one end a recess complementary to and adapted to be engaged by the said conical ends of the bearing sleeves.

2. A shaft bearing comprising, in combination with a rotary shaft, a pair of fixed bearing sleeves having their removed ends of conical shape, a common support for said bearing sleeves having an oil passage leading thereinto between the said sleeves, the said sleeves being provided with an oil passage leading therethrough to the said shaft adjacent the said conical ends of the bearing sleeves, and lock collars upon the shaft having recesses complementary to and adapted to be engaged by the said conical ends of the bearing sleeves.

3. A shaft bearing comprising, in combination with a rotary shaft, a pair of fixed bearing sleeves having their removed ends of conical shape, a common support for said bearing sleeves having an oil passage leading thereinto between the said sleeves, the said sleeves being provided with an oil passage leading therethrough to the said shaft adjacent the said conical ends of the bearing sleeves, and lock collars upon the shaft having recesses complementary to and adapted to be engaged by the said conical ends of the bearing sleeves, the said complementary recesses having spiral oil grooves formed therein.

4. A shaft bearing comprising, in combination with a shaft having a pair of oppositely tapered portions, a pair of bearing sleeves bored to fit said tapered portions of the shaft, said bearing sleeves each having one end cone-shaped, and a pair of lock collars upon said shaft each having at one end a recess complementary to and adapted to be engaged by the said cone-shaped ends of the bearing sleeves.

5. A shaft bearing comprising, in combination with a shaft having a pair of tapered portions, a pair of bearing sleeves bored to fit said tapered portions, said bearing sleeves each having one end cone-shaped, and a pair of lock collars upon the shaft each having at one end a recess complementary to and adapted to be engaged by the said cone-shaped ends of the bearing sleeves.

6. A shaft bearing comprising, in combination with a shaft having a pair of tapered portions enlarging toward each other and circumferential flanges at the adjacent ends of said tapered portions, a pair of bearing sleeves bored to fit said tapered portions of the shaft, the bores through the bearing sleeves being each enlarged to present shoulders bearing against said circumferential flanges, the opposite ends of said bearing sleeves being cone-shaped, and a pair of lock collars upon said shaft each having at one end a recess complementary to and adapted to be engaged by said cone-shaped ends of the bearing sleeves, the said recesses in the lock collars and also the tapered portions of the shaft being formed with spirally disposed oil grooves.

7. A shaft bearing comprising, in combination with a shaft having a pair of tapered portions enlarging toward each other and circumferential flanges at the adjacent ends of said tapered portions, a pair of bearing sleeves bored to fit said tapered portions of the shaft, the bores through the bearing sleeves being each enlarged to present shoulder bearing against said circumferential flanges, the opposite ends of said bearing sleeves being cone-shaped, and a pair of lock collars upon said shaft each having at one end a recess complementary to and adapted to be engaged by said cone-shaped ends of the bearing sleeves.

8. A shaft bearing comprising, in combination with a shaft having a pair of tapered portions enlarging toward each other, and circumferential flanges at the adjacent ends of said tapered portions, a pair of bearing sleeves bored to fit said tapered portions of the shaft, the bores through the bearing sleeves being each enlarged to present shoulders bearing against said circumferential flanges, the opposite ends of said bearing sleeves being cone-shaped, and a pair of lock collars upon said shaft each having at one end a recess complementary to and adapted to be engaged by said cone-shaped ends of the bearing sleeves, the said recesses in the lock collars and also the tapered portions of the shaft being formed with spirally disposed oil grooves.

Signed at city, county and State of New York, this 31st day of March, 1916.

PER F. HOLMGREN.